R. J. SWEEZEY.
ANGLE FINDER.
APPLICATION FILED APR. 26, 1916.
1,270,564.
Patented June 25, 1918.
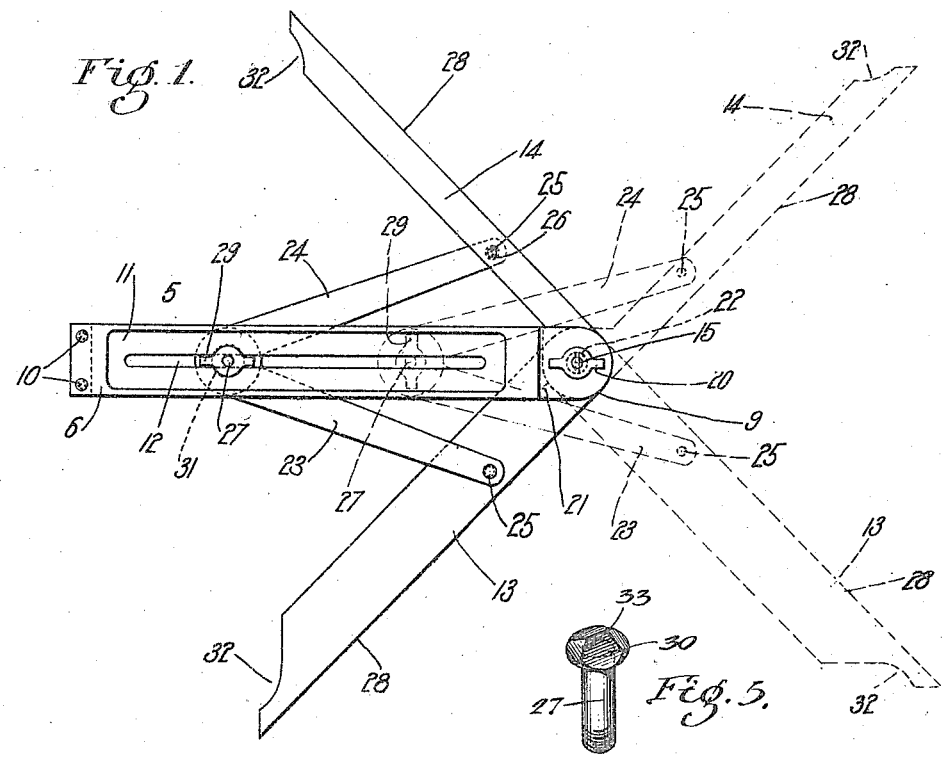
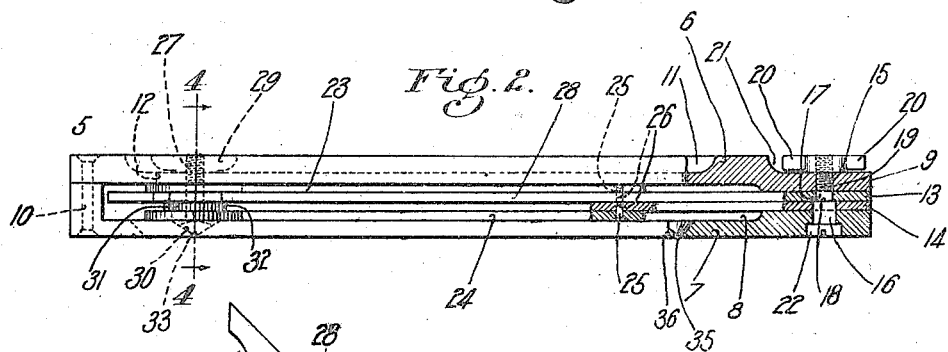
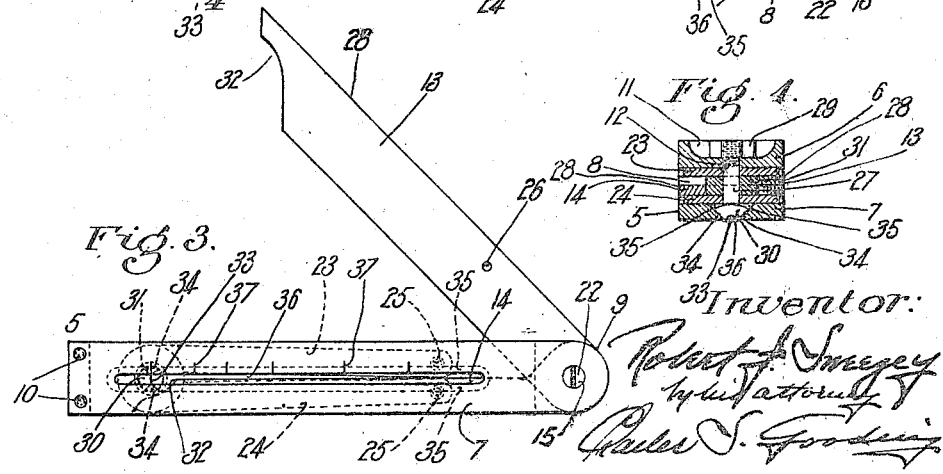
Inventor:
Robert J. Sweezey
by his attorney
Charles S. Goodwin

UNITED STATES PATENT OFFICE.

ROBERT J. SWEEZEY, OF CLIFTONDALE, MASSACHUSETTS.

ANGLE-FINDER.

1,270,564.  Specification of Letters Patent.  Patented June 25, 1918.

Application filed April 26, 1916. Serial No. 93,782.

*To all whom it may concern:*

Be it known that I, ROBERT J. SWEEZEY, a citizen of the United States, residing at Cliftondale, in the county of Essex and State of Massachusetts, have invented new and useful Improvements in Angle-Finders, of which the following is a specification.

This invention relates to improvements in angle finders, and has for its object to provide a simple, durable and accurate implement by which any angle between two surfaces may be determined and the implement set so as to preserve the angle determined, whereby other angles of like nature may be laid out.

Another object of the invention is to provide an implement of the nature set forth in which the stock is bifurcated to receive the blades and permit said implement to be used from either side or either edge thereof.

The invention consists in the combination and arrangement of parts set forth in the following specification and particularly pointed out in the claims.

Referring to the drawings:

Figure 1 is a plan view of an implement embodying my invention.

Fig. 2 is a side elevation of the same, portions of one end of said implement being shown in section.

Fig. 3 is an underneath plan view of the implement, showing the implement in a condition to be used as a bevel square.

Fig. 4 is a transverse section taken on the line 4—4 of Fig. 2.

Fig. 5 is a perspective view of the clamping screw for the links.

Like numerals refer to like parts throughout the several views of the drawings.

In the drawings, 5 is a stock of bifurcated form, consisting of two arms 6 and 7 separated by a slot 8 which extends from one end 9 thereof for the greater portion of the length of said stock. The two arms 6 and 7 are preferably formed separately and secured together preferably by rivets 10, 10. The arm 6 of the stock is recessed at 11 in its outer face for a considerable portion of its length and a slot 12 is formed at the bottom of said recess and also extends for the greater portion of the length of said arm.

A pair of blades 13 and 14 are pivotally attached to said stock adjacent to the ends 9 of said arms 6 and 7 and between said ends. A screw 15 constitutes a pivot for said blades 13 and 14, said screw having a large cylindrical portion 16 and a relatively smaller cylindrical portion 17. The cylindrical portions 16 and 17 are arranged in pivotal engagement with the blades 14 and 13 respectively and these cylindrical portions form a shoulder 18. The smaller portion of said screw is provided with screw threads 19, which screw threads are adapted to be engaged by a nut 20 arranged upon the outer face of the arm 6 through which the smaller cylindrical portion of said screw projects.

The immediate portion of said arm 6 to the screw 15 is recessed at 21 and the nut 20 is formed substantially equal in thickness to the depth of said recess so as to prevent the outer face thereof from projecting beyond the outer face of the arm 6, consequently when the nut is in its normal position it will not project beyond said outer face.

The nut 20, coöperating with the smaller cylindrical portion 17 and the shoulder 18 of the screw, is adapted to be operated to clamp the blade 13 securely against the inner face of the arm 6, permitting said blade to be moved to various predetermined positions or angles relatively to the stock and to be secured in such positions independently of the blade 14 which is only loosely pivoted upon the cylindrical portion 16. The screw 15 has a head 22 arranged within a suitable recess formed in the arm 7. There is sufficient play between the head 22 of said screw and the shoulder 18 to permit the blade 14 to be swung freely upon the portion 16 of said screw, but said head prevents any extended outward movement of the free end of the arm 7 relatively to the free end of the arm 6.

Links 23 and 24 are each provided adjacent to one end thereof with a rivet or pin 25 constructed and arranged to pivotally fit holes 26 in the blades 13 and 14 respectively at equal distances from the axis of the screw 15. The opposite ends of the links 23 and 24 are arranged between the arms 6 and 7 in the slot 8 formed in said stock, and engage a common pivot consisting of a screw 27. The screw 27 extends through the slot 12 in the arm 6 of said stock and is adapted to be moved longitudinally of said stock and when so moved causes the blades 13 and 14 to be swung about the axis of the screw 15 to vary the angle between the outer edges 28 of said blades, said outer edges constituting the working edges thereof.

The end of the screw 27 projects into the recess 11 and engages a nut 29 arranged to be operated relatively to said screw to secure said screw in a predetermined position in the slot 12. The screw 27 has a head 30 engaging the link 24, and as said nut is rotated said head will be drawn against said link and force the same against a spacing collar 31 which, in turn, is forced against the link 23 while the link 23 is forced against the inner face of the arm 6, whereupon said links will be firmly secured to the stock and further movement of the arms 13 and 14 relatively to each other be prevented.

When the screw 27 is moved to the extreme inner end of the slot 12, that is the end nearest the rivets 10, the working edges 28 of the blades 13 and 14 will accurately aline with the opposite edges respectively of the stock 5, the blade 14 being shown in this position in Fig. 3. Portions of the blades 13 and 14 are cut away at 32 to provide clearance for the spacing collar 31. The movement of the screw 27 toward the outer end of the slot 12 causes the blades 13 and 14 to be moved to different angles as indicated by the full lines and dotted lines in Fig. 1. To determine the exact angle at which the blades 13 and 14 are positioned with respect to said stock, the head 30 of the screw 27 is beveled upon opposite sides to form an edge 33.

Furthermore, at right angles to the bevel forming the edge 33 said head is beveled at 34, 34, thus forming a substantially pyramidal head. The beveled faces 34, 34 engage correspondingly beveled surfaces 35 formed upon the inner face of the arm 7 to prevent the rotation of the screw 27 and permitting the edge 33 to project through said arm sufficient to substantially aline with the outer face of said arm 7 through a slot 36 extending longitudinally of said arm. Along one edge of said slot are arranged index marks 37 which coöperate with the edge 33 to indicate the angles of the blades 13 and 14 with respect to the stock.

In operating the implement to determine an angle the nut 20 is released freeing the arm 13. The nut 29 is then released and the screw 27 moved lengthwise of the slot in the direction desired until the proper angle between the edges 28, 28 of the blades 13 and 14 is found after which the nut 29 is then turned to secure the links 23 and 24 to the stock. When it is desired to use the blade 13 independent of the blade 14, the pin 25 at the outer end of the link 24 is withdrawn from the hole 26.

The screw 27 is then moved to the extreme inner end of the slot 12 as indicated in Fig. 3, thereby moving the blade 14 until the outer face 28 thereof alines with the adjacent edge of the stock, and at this time the link 23 is moved into a position within the slot 8. This leaves the blade 13 free to be moved at will to any angle desired and after the proper angle has been determined the nut 20 is moved to draw the shoulder 18 of the screw 15 against the blade 13 and thus secure said blade to the arm 6 of the stock.

With the blades of the implement arranged between the two arms of the stock it will not be necessary to use care in arranging the stock right side up for the reason that either side may be employed with equally satisfactory results.

Having thus described my invention what I claim and desire by Letters Patent to secure is:

1. An implement of the class described having, in combination, a stock, a pair of blades, piovtally attached to said stock adjacent to one end thereof, and a screw constituting the pivot for both of said blades, a shoulder on said screw constructed and arranged to secure one of the blades pivoted on said screw at a predetermined angle to said stock, the other of said blades being free to move on said screw.

2. An implement of the class described having, in combination, a stock, a pair of blades pivotally attached to said stock, a screw constituting the pivot for both of said blades, said screw having a large cylindrical member and a relatively smaller cylindrical member arranged in pivotal engagement with said blades respectively, said large cylindrical member forming a shoulder adapted to engage one face of the blade engaging said small cylindrical member, and a nut engaging said screw adapted to move said shoulder against the blade pivoted upon said small cylindrical member and secure said blade stationary in said stock, the blade engaging said large cylindrical member being free to move thereon.

3. An implement of the class described having, in combination, a stock, a pair of blades pivotally attached to said stock, a pair of links attached to said stock, a stud constituting a pivot for both of said links, said stud having slidable engagement with said stock, means for securing said links in fixed relation to said stock, and a headless pin secured to one of said links and pivotally engaging one of said blades adapted to be withdrawn at will from said blade so as to permit the other blade to be moved by the link attached thereto relatively to said disconnected blade.

4. An implement of the class described having, in combination, a stock having a slot extending lengthwise thereof forming parallel arms, one of said arms having a recess extending longitudinally of the outer face thereof, said arm also having a slot communicating with said recess from the inner face of said arm, the other arm of said stock having a beveled recess extending longitudinally of the inner face thereof, the bottom of said recess opening to the outer face of said arm, a pair of blades pivoted between the arms of said stock, a pair of links each pivoted at one end to one of said blades, a stud extending through the other ends of both of said links, said stud being arranged to project through said slot and into the recess with which said slot communicates, a nut engaging said stud within said recess adapted to secure said stud in a predetermined position in said slot, and a substantially pyramidal head for said stud adapted to slidingly engage the sides of said beveled recess to prevent said stud from rotating.

5. An implement of the class described having, in combination, a stock, a pair of blades pivotally attached to said stock, a screw constituting a pivot for both of said blades, a shoulder on said screw constructed and arranged to secure one of the blades pivoted on said screw at a predetermined angle to said stock, the other of said blades being free to move on said screw, and means constructed and arranged to secure said free blade at a predetermined angle with respect to the other blade.

In testimony whereof I have hereunto set my hand in presence of two subscribing witnesses.

ROBERT J. SWEEZEY.

Witnesses:
SYDNEY E. TAFT,
HATTIE E. STRATTON.

Copies of this patent may be obtained for five cents each, by addressing the "Commissioner of Patents, Washington, D. C."